June 1, 1965     A. B. STILES     3,186,806
CATALYTIC EXHAUST CONVERTER
Filed Nov. 20, 1961
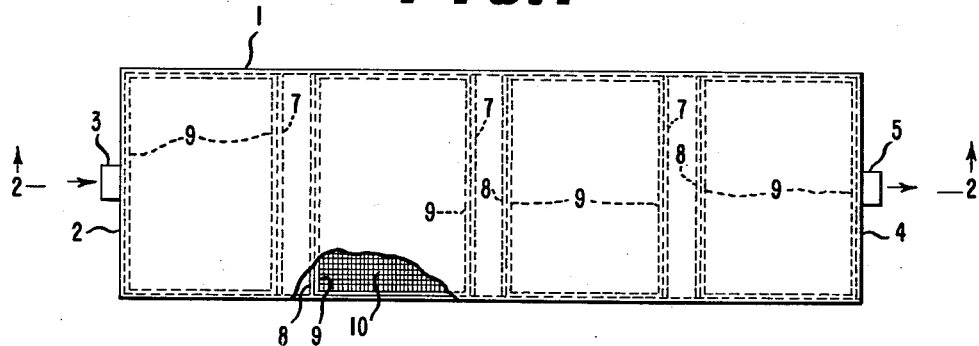
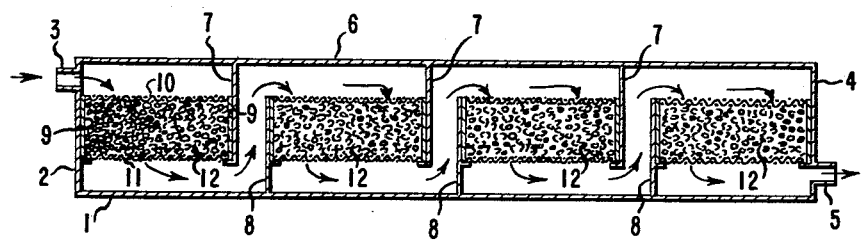
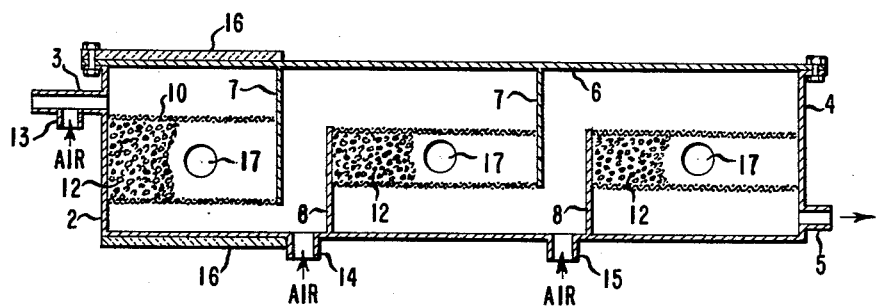
INVENTOR
ALVIN B. STILES
BY *Albert B. Griggs*
ATTORNEY

United States Patent Office 3,186,806
Patented June 1, 1965

3,186,806
CATALYTIC EXHAUST CONVERTER
Alvin B. Stiles, Charleston, W. Va., assignor to E. I. du Pont de Nemours and Company, Wilmington, Del., a corporation of Delaware
Filed Nov. 20, 1961, Ser. No. 153,391
2 Claims. (Cl. 23—288)

This invention relates to catalytic apparatus and is more particularly directed to an automobile exhaust catalytic converter provided with a series of horizontally disposed catalyst cartridges through which exhaust gases successively pass from top to bottom.

In the drawing:

FIGURE 1 is a top view of a catalytic converter of the invention,

FIGURE 2 is a cross section showing the arrangement of catalyst cartridges in the converter, and FIGURE 3 is a similar cross section showing a modified apparatus of the invention.

Catalytic converters designed for use with internal combustion engines and particularly for use on automotive vehicles customarily pass gases through comparatively thin catalyst beds to avoid excessive back-pressure. This results in a decrease in efficiency. Gases passing through the usual catalytic converters tend to become overheated and to deactivate the catalyst. This problem is particularly severe with the relatively small converters permissible on automotive vehicles.

According to the present invention a catalyst is contained in a series of horizontally disposed cartridges. Baffles are provided so that the gasses pass through the catalyst in a downward direction in each cartridge and then pass upwardly through unobstructed passages between the baffles. In the apparatus of the invention a high superficial gas velocity is obtained together with a downflow of gas through a relatively thin bed. The overall effect of the use of a number of stages according to the invention is equivalent to the use of a very thick bed of catalyst but without the attendant disadvantage of overheating. Cooling of the gases results from the arrangement of baffles which allows considerable heat exchange.

In order that the invention may be better understood reference should be had to the drawings where in FIGURE 1 there is shown a catalyst chamber having a single unitary housing generally designated at 1. This includes a front end wall 2 provided near its top with a gas inlet 3. The back end wall 4 is provided with a gas exit 5. A removable top is provided through which access can be obtained to the interior of the catalytic apparatus. Transverse baffles 7 are provided extending from the top towards, but not reaching, the bottom of the apparatus. Similarly, transverse baffles 8 are provided extending upwardly, but not reaching, the top of the apparatus.

A series of catalytic cartridges are provided which as illustrated have side walls 9 forming a frame upon which is affixed two screens 10 and 11. The screens retain catalyst in place. The cartridges can readily be removed by removing the top 6. This is particularly convenient because ordinarily the first of the catalytic cartridges will become deactivated before the remaining cartridges, moved forward, and a new one placed at the back. It will be understood that instead of making the cartridges removable as shown, the screens 11 can be fastened in place and the screens 10 can be removed for removal and recharging of catalyst.

The arrangement of catalytic cartridges in a horizontal line as shown and using baffles as shown results in a much higher superficial velocity of gases than if, for example, the catalyst were a single mass and the gases were passing through the entire bed at once. The effect of velocity on 20 pounds of catalyst can be illustrated as follows:

| Velocity (feet per minute): | Percent conversions |
|---|---|
| 300 | 90 |
| 200 | 80 |
| 100 | 74 |

Thus a catalytic bed of the usual type with large cross sections results in low superficial velocities which are ordinarily 100 feet per minute or less with consequent low catalyst efficiency. With a multi-stage downflow reactor as described a thin bed is used with a minimum cross-section, depending upon the allowable pressure drop. This results in high superficial velocities which can be 300 feet per minute or more with correspondingly high catalyst conversion efficiency.

A particular advantage of the arrangement of catalysts as described is that the void spaces which result from cross-flow and attrition are largely avoided. The marked effect of void space upon efficiency is illustrated by the following:

| Percent (vol.) void space: | Percent conversion |
|---|---|
| 0 | 90 |
| 5 | 50 |

Similar results are obtained by a modified apparatus as shown in FIGURE 3. In FIGURE 3 similar parts receive the same numerals as in FIGURES 1 and 2. Insulation 16 is provided around the first stage which shortens the time required for warm-up of the catalyst. More or less insulation can similarly be provided along the catalytic converter as desired to regulate the temperatures within the converter with a device designed for a particular automotive vehicle.

In the modification of FIGURE 3 air is introduced at 13 to the intake 3 and is additionally supplied between the stages 14 and 15. In the modification of FIGURES 1 and 2 the incoming gases contain the appropriate amount of air and in the modification of FIGURE 3 the air is divided. By regulating the amount of air at each stage the amount of heat generated in each successive stage can be limited. Thus the temperatures in a given stage can be limited and regulated by the use both of insulation as shown and by adding more or less air as higher temperatures or lower temperatures are wanted.

In the modification of FIGURE 3, charging holes 17 are illustrated in the back wall of the converter. These can be opened to allow removal of exhausted catalyst and to charge new catalyst.

As shown in FIGURE 3 the catalyst beds need not all be of the same size or shape. The first bed of catalyst is thicker than the beds in the succeeding chambers and is somewhat shorter. This promotes quick heat-up of gases in the first chamber when operation is begun. The relatively thinner beds in the succeeding chambers give high efficiency with comparatively longer catalyst life. It will be understood that more or less beds can be used.

I claim:

1. An automobile exhaust catalytic converter comprising a catalyst chamber having a single unitary housing with a gas inlet located near the top of the housing at one end and having a gas exit located near the bottom of the housing at the opposite end, transverse baffles located along the length of the housing and extending alternately from the top and bottom of the housing toward but not reaching the opposite side, a horizontally disposed series of catalyst cartridges, each cartridge comprising a frame with screen on its top and bottom adapted to retain the catalyst, the said catalyst cartridges being mounted between the front end wall of the converter and the first baffle, between the back end wall of the converter and the last baffle, and between successive pairs of upwardly and downwardly extending baffles respectively so as to provide unobstructed vertical passages between the cartridges whereby gases entering the converter are caused to pass downwardly through each such catalyst cartridge and upwardly through each such vertical passage.

2. An automobile exhaust catalytic converter as described in claim 1 having inlets in the housing adjacent the vertical passages to permit introduction of air into said passages.

References Cited by the Examiner

UNITED STATES PATENTS

| | | | |
|---|---|---|---|
| 1,402,814 | 1/22 | Wachtel | 23—288.3 |
| 1,867,325 | 7/32 | Neville | 23—288.3 |
| 2,909,415 | 10/59 | Houdry | 23—288.3 |
| 2,945,748 | 7/60 | Magill | 23—288 |
| 3,024,593 | 3/62 | Houdry | 23—288.3 |

MORRIS O. WOLK, *Primary Examiner.*

MAURICE A. BRINDISI, *Examiner.*